UNITED STATES PATENT OFFICE.

ROBERT G. HALL, OF ST. LOUIS, MISSOURI.

PROCESS OF CONCENTRATING ORES.

1,276,058.  Specification of Letters Patent.  Patented Aug. 20, 1918.

No Drawing.  Application filed September 15, 1916. Serial No. 120,396.

*To all whom it may concern:*

Be it known that I, ROBERT G. HALL, a citizen of the United States, residing at St. Louis, State of Missouri, have invented an Improvement in Processes of Concentrating Ores, of which the following is a specification.

The processes hitherto used for extracting zinc and lead from complex ores, especially those containing small amounts of other valuable metals, as copper, silver and gold, have generally been varied to suit the character of each ore, and have almost invariably resulted in a great loss of the metals.

The customary methods have been:—

Physical.

Dependent on the difference in specific gravity of the mineral constituents of the ore. This has generally resulted in the production of concentrates of the several metals more or less separated, each containing an amount of some or all of the other valuable metals which in this form became lost, as, for example, small amounts of lead, silver and copper in zinc concentrates, or of zinc in the concentrate of the other metals. Besides this there generally result certain mixed products further inseparable, and of no more value in this form.

Electrical.

This method of separation is based on a difference either existing, or that may be produced, in the electrical or magnetic properties of the various metallic mineral constituents, and it does not in most cases give clean products, or complete separation of the minerals, but only such as each ore may give according to its various properties.

Chemical.

Chemical methods of separation are based on the solubility of certain of the constituents in particular solvents, as, for example, zinc may be dissolved from a carbonate ore, or from an ore either naturally or artifically oxidized, and in case of the use of sulfuric acid as solvent, any lead present will remain beind insoluble. The disadvantages of this method are that all the zinc in such ores may not be completely soluble, and further that other metals, such as copper are equally liable to solution. In addition, certain bases such as lime will consume portions of the acid. Or, the metal constituents of an ore may be converted into chlorids, as proposed by Malm and others, but in this case there still remains the difficulty of the separation of the metallic chlorids.

Many other methods of separation have been proposed, as, for example, selective flotation, and various others, but in most, if not all, cases, the separation is not absolute, and the losses of byproducts or between-products are heavy.

In addition to the above, certain furnace methods have been used, as, for example, Bartlett's blast furnace, whereby the mixed ores are charged into a special type of blast furnace, and the zinc and lead with some of the silver are volatilized, while the copper and the remaining silver and gold are recovered as a matte. It is known that this method of operation involves high losses of zinc in the slag from such a furnace, or else the retreatment of such slag in another and separate furnace, and also that the matte made in such blast furnace is certain to contain large quantities of both zinc and lead.

Other inventors, as, for example, Pappe, propose the roasting of such ores where necessary, mixing of same with reducing material, as finely ground coke, briqueting of the resulting mixture, and smelting of the same in a specially designed furnace, such as one of the Wetherill type, for the volatilizing of the zinc and lead. The objection to this method is chiefly its high cost, and complexity.

Desgratz, in his Patent #1,072,209, proposes, first, reducing such ores to a liquid or slag condition, then reacting on such slag with lime and a reducing or carbonaceous material, thus volatilizing all volatile substances.

My newly-invented process differs from the above in that the oxidized, mixed ores, or in the case of sulfids, the desulfurized, or partially desulfurized ores are mixed with the proper quantity of reducing material, and without further treatment are charged directly into a reverberatory furnace, and there submitted to the heat of such furnace so that all the zinc and all the lead, together with such other reducible volatile metals as may be present, are expelled from the charge and carried out with the products of combustion in an easily recoverable form. All of the copper and gold, together with the greater part of the silver, will enter the matte formed with the residual sulfur present in the charge, while the waste material of the ore present will form a slag in the usual manner. By the proper proportioning of the charge, any zinc and lead can be prevented from entering the matte, inasmuch as should such metal enter the matte as a sulfid it may be removed therefrom by having present oxid of iron in excess of the quantity necessary to form a slag, a customary flux in the smelting of most ores of the non-ferrous metals. For example, in the case of a sulfid ore partially roasted so much sulfur may remain present as may be most desirable to form a matte of the grade desired. In such case, the sulfids of zinc and lead will be decomposed according to the reaction:—

$$ZnS + FeO + C = Zn + FeS + CO$$
and
$$PbS + FeO + C = Pb + FeS + CO$$

The reactions involved in the reduction of the oxids of zinc and lead by means of carbon are of course those commonly involved in the reduction by means of carbonaceous material. Furthermore there may be used in this reaction not only the solid and non-volatile forms of carbon, as coke, etc., but also those forms containing volatile constituents, as, for instance, the lower grades of bituminous coal and other waste material which may contain sufficient amounts of fixed carbon or other non-volatile reduction material. In this case the volatile combustible material from the charge, as well as the carbon monoxid resulting from the reduction of the metallic oxid will burn within the furnace and on the surface of the charge, an oxiding atmosphere being maintained in the furnace, and thus give valuable aid in the fusion of the charge.

By the above described method of smelting the mixed and complex ores I am able to handle directly all oxidized, and, by a partial preliminary roast, as, for example, to five to ten per cent. of sulfur, all sulfid ores without direct concentration, and without briqueting, forming directly the following products:

*Waste material in the form of slag.*—By the blast furnace method of smelting much care has to be taken with the composition of this slag, as slags of certain composition, as, for example, those containing considerable quantities of ferrous oxid, will carry off large quantities of valuable zinc, which must be removed in subsequent operations, and at considerable expense. I am able by the above method to make slags of exceedingly variable composition in silica, ferrous oxid and lime, which are the principal waste materials of the ores in question, and at all times to get proper and commercially clean slags, practically free from lead, zinc, copper, silver and gold.

*Matte.*—The separation of the matte from the slag by this method of smelting is remarkably clean, for the reason that the matte formed may be of ample quantity, and in entire control of the operator, so that there is a continuous "matte fall" or formation to carry down the precious metals and the copper of the ore, and this matte is of such a nature that the melting point is low and the specific gravity is high, since there is no zinc sulfid present to raise the melting point and lower the specific gravity. Hence there is at all times good separation of this matte from the waste material or slag, and the recovery of the values is thereby promoted.

*Fume, or volatilized material.*—The material volatilized from the charge is of course immediately reoxidized by the atmosphere of the furnace, and carried along with the waste gases through waste heat boilers, or such cooling devices as may be necessary before recovery of the values in settling chambers, filter-bags, or other methods of recovery. This fume will contain all of the zinc and lead as oxids, or to some extent as sulfates, together with some small quantity of the silver, with such other small amounts of reducible metals as may under the conditions of the furnace be volatile, as, for example, cadmium, antimony, etc.

The subsequent treatment of the valuable products will, of course, depend on economic conditions. Thus the matte formed if low in grade of copper, gold or silver, or all three may be sent back through the same cycle as the ore, partially roasted and again charged into the furnace in the manner usual in ordinary methods of smelting, or it may be smelted directly, or converted by the Manhees process to metallic copper. The recovered oxids may be made use of either directly as a pigment, or the metals may be separated and recovered.

The use of the reverberatory furnace in the manner above described for the direct smelting of the complex ores above mentioned is a distinct advance and improvement over any method now in use. I do not claim any particular design or type of reverberatory furnace, but find that the reaction can be carried out in almost any type of reverberatory furnace, but may be especially well carried out by the method known as side charging, whereby the charge prepared as above described, is fed in along the sides of the furnace in small quantities and at frequent intervals, thus giving a better opportunity for the release of the volatile constituents.

I claim:—

1. The process of concentrating ores which consists in mixing oxidized ores containing zinc, lead, and other valuable metals with a reducing material, and with a small amount of material containing sulfur sufficient to form a matte with the other valuable metals of the ores, and without further treatment, subjecting the same to the heat of a reverberatory furnace, thereby reducing and volatilizing the zinc and lead, and concentrating the other valuable metals as copper, silver, and gold, in the form of a matte, and eliminating the waste material as a slag in a molten condition, free from the valuable metals of the charge.

2. The process of concentrating ores, which consists in partially roasting ore containing zinc, lead, and other valuable metals, then mixing with the roasted ore a reducing material, the charge containing sulfur in the form of sulfid in amount sufficient to form a matte, and without further treatment subjecting the same to the heat of a reverberatory furnace, thereby reducing and volatilizing the zinc and lead, and concentrating the other valuable metals as copper, silver and gold, in the form of a matte, and eliminating the waste material as a slag in a molten condition, free from the valuable metals of the charge.

In testimony whereof, I have signed my name to this specification, in the presence of two subscribing witnesses.

ROBERT G. HALL.

Witnesses:
C. A. GRISHAM,
F. S. WOODBURN.